(12) United States Patent
Kilshaw (10) Patent No.: US 8,944,945 B2
(45) Date of Patent: Feb. 3, 2015

(54) CHAIN TENSIONER

(76) Inventor: Richard J. Kilshaw, Lake Oswego, OR (US)

( * ) Notice: Subject to any disclaimer, the term of this patent is extended or adjusted under 35 U.S.C. 154(b) by 781 days.

(21) Appl. No.: 12/759,936

(22) Filed: Apr. 14, 2010

(65) Prior Publication Data

US 2011/0256971 A1   Oct. 20, 2011

(51) Int. Cl.
*F16H 9/00* (2006.01)
*F16H 59/00* (2006.01)
*F16H 61/00* (2006.01)
*F16H 63/00* (2006.01)
*B62M 9/16* (2006.01)
*B62J 13/00* (2006.01)
*B62M 9/04* (2006.01)

(52) U.S. Cl.
CPC . *B62M 9/16* (2013.01); *B62J 13/00* (2013.01); *B62M 9/04* (2013.01)
USPC .............................. 474/80; 474/78

(58) Field of Classification Search
CPC ........................ F16H 7/1281; F16H 2007/0806
USPC ...................................... 474/78, 80
See application file for complete search history.

(56) References Cited

U.S. PATENT DOCUMENTS

| | | | |
|---|---|---|---|
| 3,913,410 A | 10/1975 | Ackerman | |
| 4,564,098 A | 1/1986 | Hormann | |
| 5,013,285 A | 5/1991 | Carlyle | |
| 5,460,576 A * | 10/1995 | Barnett | 474/144 |
| 5,730,670 A | 3/1998 | Ferrarin | |
| 6,325,734 B1 * | 12/2001 | Young | 474/202 |
| 6,793,598 B1 | 9/2004 | Savard | |
| 6,942,589 B2 | 9/2005 | Rogers | |
| 7,036,836 B2 | 5/2006 | Hsieh | |
| 7,361,109 B2 * | 4/2008 | Kilshaw | 474/81 |
| 7,597,638 B2 * | 10/2009 | Cooke | 474/78 |
| 7,654,925 B2 * | 2/2010 | Todd | 474/152 |
| 7,699,733 B2 * | 4/2010 | Sakura et al. | 474/161 |
| 7,736,253 B2 * | 6/2010 | Matsumoto et al. | 474/81 |
| 7,905,805 B2 * | 3/2011 | Hara | 474/81 |
| 2002/0132689 A1 * | 9/2002 | Young | 474/156 |
| 2003/0087714 A1 * | 5/2003 | Todd | 474/156 |
| 2004/0014543 A1 * | 1/2004 | Van Der Linde | 474/160 |
| 2004/0097308 A1 * | 5/2004 | Hsieh | 474/78 |
| 2004/0130120 A1 * | 7/2004 | Matsumoto et al. | 280/260 |
| 2004/0185977 A1 * | 9/2004 | Young et al. | 474/202 |
| 2005/0173890 A1 * | 8/2005 | Matsumoto et al. | 280/261 |
| 2005/0215367 A1 * | 9/2005 | Thomasberg | 474/78 |
| 2006/0046881 A1 * | 3/2006 | Matsumoto et al. | 474/81 |
| 2006/0058131 A1 * | 3/2006 | Cooke | 474/78 |
| 2006/0135304 A1 * | 6/2006 | Sonoda | 474/152 |
| 2006/0240919 A1 * | 10/2006 | Matsumoto et al. | 474/78 |
| 2006/0270499 A1 * | 11/2006 | Kilshaw | 474/78 |
| 2006/0276285 A1 | 12/2006 | Markley et al. | |
| 2007/0087878 A1 * | 4/2007 | Ogawa et al. | 474/156 |
| 2008/0261735 A1 * | 10/2008 | Cappellini | 474/78 |
| 2009/0258738 A1 * | 10/2009 | Hara | 474/112 |

* cited by examiner

*Primary Examiner* — Henry Liu
(74) *Attorney, Agent, or Firm* — Timothy E. Siegel Patent Law, PLLC; Timothy E. Siegel (57) ABSTRACT

A roller-chain tensioning assembly includes a resilient bow-shaped structure to which are mounted first, second and third guide wheels. These guide wheels are mounted in such manner that a roller chain can be threaded around said first guide wheel on side facing away from said bow, around said second guide wheel on side facing said bow, and around said third guide wheel on side facing away from said bow.

18 Claims, 10 Drawing Sheets

CHAIN TENSIONER

BACKGROUND

Since the advent of mountain biking, there has been a perceived need for a bicycle gearing system that both is resistant to being derailed by debris that is accidentally kicked up into the gear set by a bicycle rider and yet offers a wide range of gearing. Toward this goal gearing systems have appeared in the literature, in which the gears are encased in a protective housing.

In these new systems a drive wheel may be co-journalled with a driven set of gears and, in turn, drive a cog wheel on the bicycle's rear wheel. Unfortunately, these systems do not have as wide a range of gearing options as some mountain biking enthusiasts might desire. Moreover, the inner workings of some gear box designs are fairly complicated, resulting in a gear box that is heavier and more prone to larger frictional losses and rapid wear than is desirable.

Moreover, these newer types of bicycle transmissions, in which sprockets are placed in close proximity to each other, do not offer as fast a transition between gears as some bicycle riders prefer. They also typically do not permit a change between gears of more than one gear spacing, for example from third gear to sixth gear. Accordingly, there is a need for a gear assembly that permits faster gear changes and gear skipping during a gear change.

SUMMARY

The following embodiments and aspects thereof are described and illustrated in conjunction with systems, tools and methods which are meant to be exemplary and illustrative, not limiting in scope. In various embodiments, one or more of the above-described problems have been reduced or eliminated, while other embodiments are directed to other improvements.

In a first separate aspect, the present invention may take the form of a roller-chain tensioning assembly that includes a resilient bow-shaped structure to which are mounted first, second and third guide wheels. These guide wheels are mounted in such manner that a roller chain can be threaded around the first guide wheel on side facing away from the bow, around the second guide wheel on side facing the bow, and around the third guide wheel on side facing away from the bow.

In a second separate aspect, the present invention may take the form of a gear set that includes two sprocket sets, defining a longitudinal dimension along which the sprockets are aligned and a transverse dimension, along which sprockets of each set are spaced. The sprocket sets are controlled to move transversely relative to each other over a range of transverse displacement. Also, a roller-chain tensioner has a chain-entrance guide wheel and a chain-exit guide wheel and a roller-chain is arranged in a loop, and adapted to move about a sprocket of each of the sprocket sets and the roller-chain tensioner guide wheels. Finally, the roller-chain tensioner has flexibility in the transverse dimension, to permit the chain-exit guide wheel to be transversely displaced from the chain-entrance guide wheel by the range of transverse displacement.

In a third separate aspect, the present invention may take the form of a gear set that includes two sprocket sets, defining a longitudinal dimension along which the sprockets are aligned, and a transverse dimension, along which sprockets of each set are spaced. Also, a roller-chain tensioner includes a resilient bow-shaped structure rotatably supporting a chain-entrance guide wheel and a chain-exit guide wheel and a roller-chain is arranged in a loop about a sprocket from each sprocket set and the roller-chain tensioner guide wheels. The roller-chain tensioner is moved transversely to effect a change of gears.

In a fourth separate aspect, the present invention may take the form of a gear set that includes first and second sprockets, defining a longitudinal dimension along which the sprockets are aligned, and a transverse dimension, along which additional sprockets adjacent to the first sprocket defining a first sprocket set, are spaced. Also, a roller-chain tensioner includes a resilient bow-shaped structure rotatably supporting a chain-entrance guide wheel and a chain-exit guide wheel and a roller-chain is arranged in a loop about first and second sprockets and the roller-chain tensioner guide wheels. The roller-chain tensioner is moved transversely to effect a change of gears. The second sprocket is transversely displaced by the chain driving action and aligns with each additional sprocket in the longitudinal dimension. A chain cage prevents the chain from dropping off the second sprocket.

In a fifth separate aspect, the present invention may take the form of a gear set that includes a driving sprocket set and a driven sprocket set, defining a longitudinal dimension along which the sprockets are aligned, and a transverse dimension, along which sprockets of each set are spaced. A chain cage is positioned between the two sprocket sets and a roller-chain is arranged in a loop about a sprocket from each sprocket set, defining a drive portion of chain which is placed in tension by the driving sprocket set and pulling the driven sprocket set. This drive portion is threaded through the chain cage, which is moved transversely to effect a gear change. The chain cage is also moved inwardly toward the driving sprocket set during a gear change to a smaller driving sprocket, so that the chain cage can be positioned close to the driving sprocket, for each gear.

In addition to the exemplary aspects and embodiments described above, further aspects and embodiments will become apparent by reference to the drawings and by study of the following detailed descriptions.

BRIEF DESCRIPTION OF THE DRAWINGS

Exemplary embodiments are illustrated in referenced drawings. It is intended that the embodiments and figures disclosed herein are to be considered illustrative rather than restrictive.

DETAILED DESCRIPTION OF THE PREFERRED EMBODIMENT

One preferred embodiment of the present invention utilizes or incorporates elements of the gear system disclosed in U.S.

Pat. No. 7,361,109, issued to Richard J. Kilshaw, which is hereby incorporated by reference as if fully set forth herein.

Figure 1:
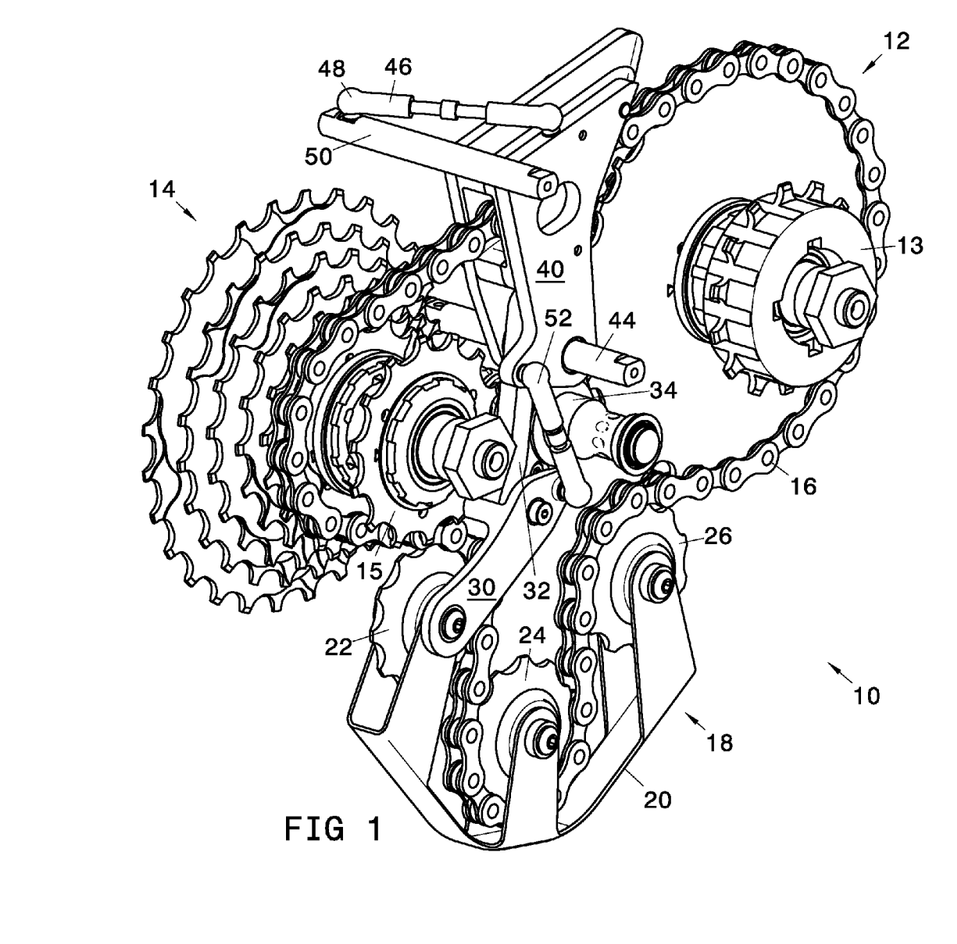
FIG. 1 is a side perspective view of a gear set, according to the present invention, in highest gear.
Figure 2:
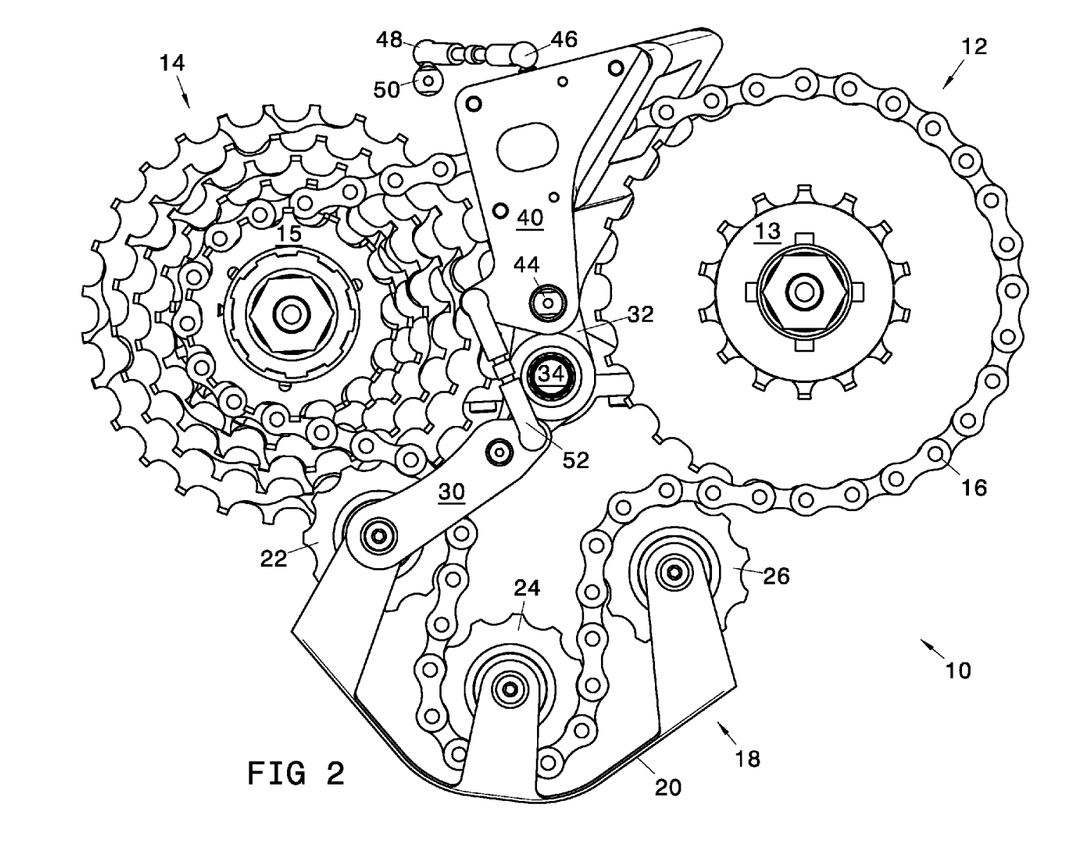
FIG. 2 is a side view of the gear set configuration of FIG. 1.
Figure 7:
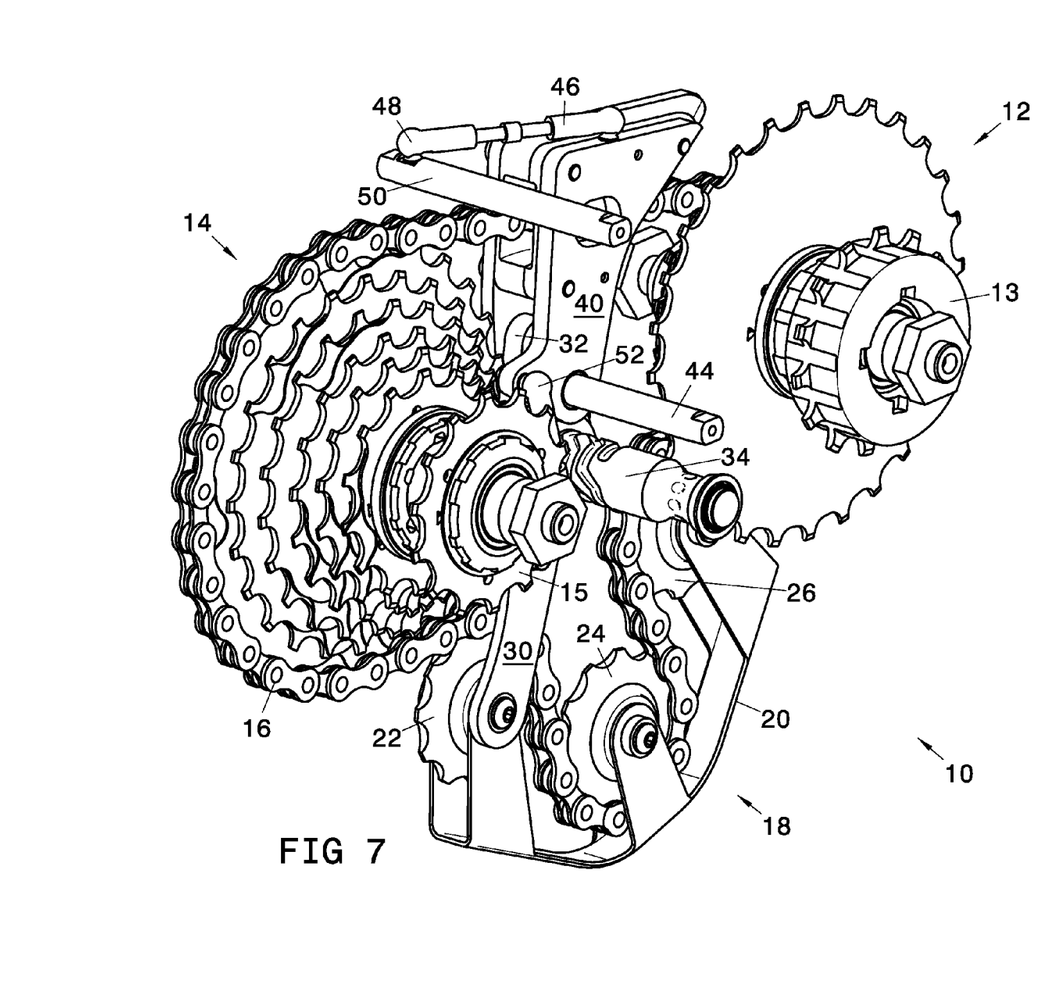
FIG. 7 is a side perspective view of the gear set of FIG. 1, but in lowest gear.
Figure 10:
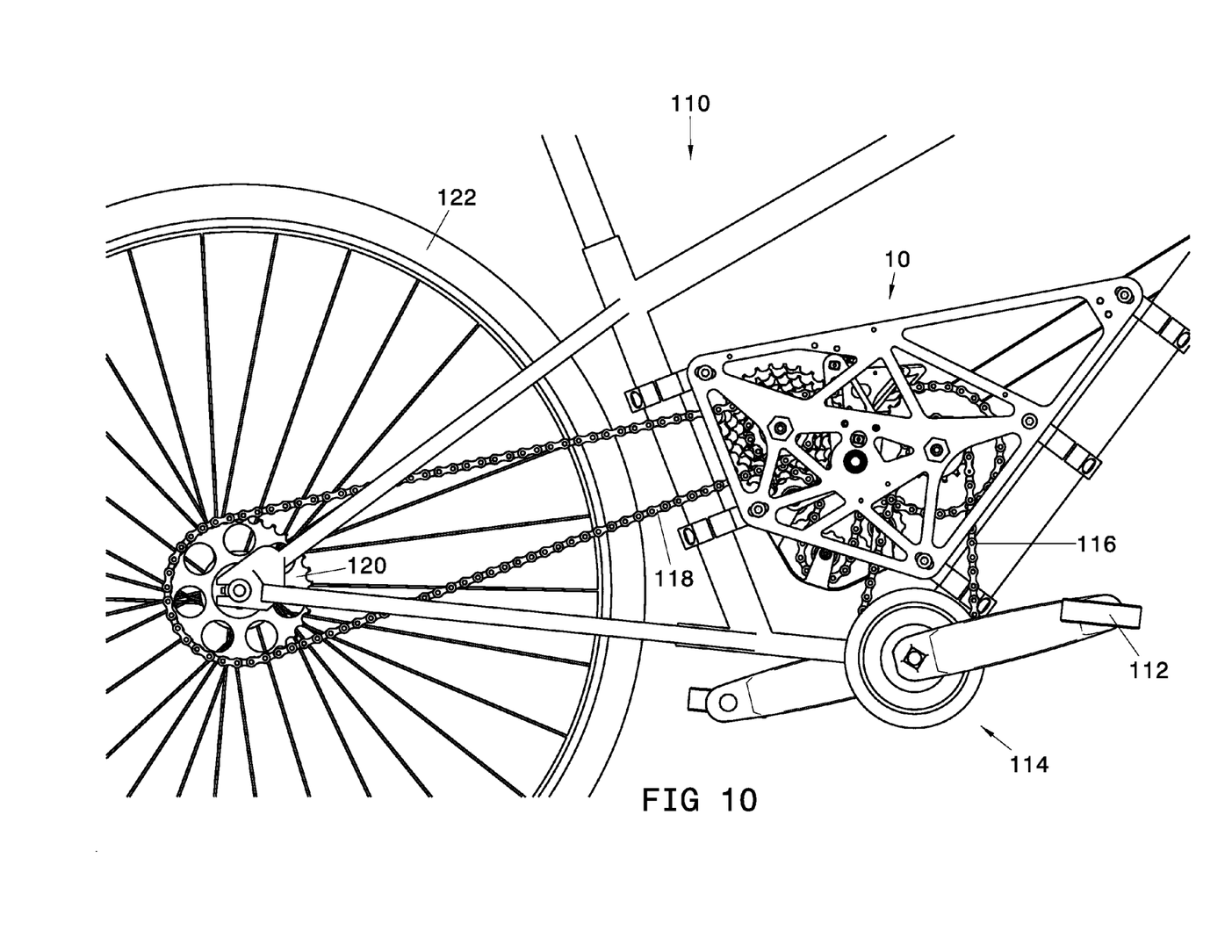
FIG. 10 is a side view of a bicycle, according to the present invention, which includes the gear set of FIG. 1.

Referring to FIG. 1, a preferred embodiment of a gear set 10, includes a driving sprocket set 12 and a driven sprocket set 14, each including a set of sprockets of increasing size. Driving sprocket set 12 is driven by input freewheel sprocket 13, which is driven by a chain 116 (FIG. 10) operatively driven by a pair of pedals 112 (FIG. 10) and driven sprocket set 14, by way of output sprocket 15, drives bicycle rear wheel 122 (FIG. 10). In FIG. 1, sets 12 and 14 are placed in a first relative positioning, so that the smallest sprocket of set 12 is aligned to the largest sprocket of set 14, and the smallest sprocket of set 14 is aligned to the largest sprocket of set 12. In a second relative positioning, the largest sprocket of set 14 is aligned to the second smallest sprocket of set 12. By shifting sprocket set 14 back and forth by the transverse distance between two adjacent sprockets of set 12, and by urging a loop of roller chain 16 to shift from one sprocket to the next, the chain may be walked across the full set of sprockets, from a highest gear, in which the smallest sprocket of set 14 and roller chain 16 are aligned to the largest sprocket of set 12 (as in FIG. 1), to a lowest gear, in which the largest sprocket of set 14 and roller chain 16 are aligned to the smallest sprocket of set 12 (FIG. 7).

In different transverse positions, the length of chain 16 needed to complete the loop about the sprockets varies. Moreover, chain 16 must have sufficient tension to avoid slipping as force is placed on it by one of sprockets 12, yet have enough slack to permit it to be moved transversely between sprockets. To keep the chain 16 in proper tension it is threaded through a chain tensioner 18, which is made up of a resilient bow 20, to which are mounted chain exit guide wheel 22, medial guide wheel 24 and chain entry guide wheel 26. Chain 16 is mounted around first guide wheel 22, on the side furthest from bow 20, then around second guide wheel, on the side facing bow 20, and around third guide wheel, on the side facing away from bow 20, as shown.

Chain tensioner 18 is mounted on link 30, which is in turn rotatably supported by guide bar chain shift follower 32, itself supported by guide bar 34. A chain cage 40 is also supported by follower 32, and helps to move chain 16 during gear shifts. Chain-contact surfaces of chain cage 40 and guide wheels 22, 24, 26 are preferably made from Ultra high molecular weight polyethylene. As guide bar 34 is rotated, follower 32, and therefore tensioner 18 is moved, in increments, from a first transverse end (highest gear, shown in FIG. 1) to a second transverse end (FIG. 7). In one preferred embodiment, guide bar 34 is rotated by a user controlled cable, as is disclosed in U.S. Pat. No. 7,361,109. In an alternative preferred embodiment, guide bar 34 is rotated by an electric motor that is user controlled.

Figure 4:
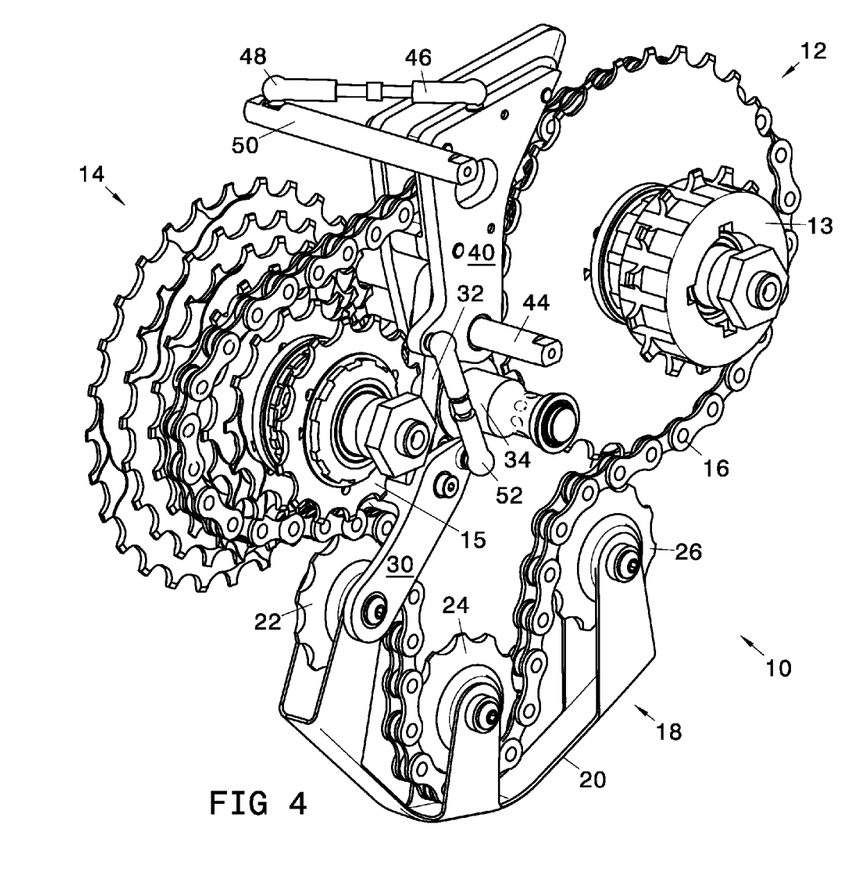
FIG. 4 is a side perspective view of the gear set of FIG. 1, but in the process of completing a gear change into an intermediate gear.
Figure 5:
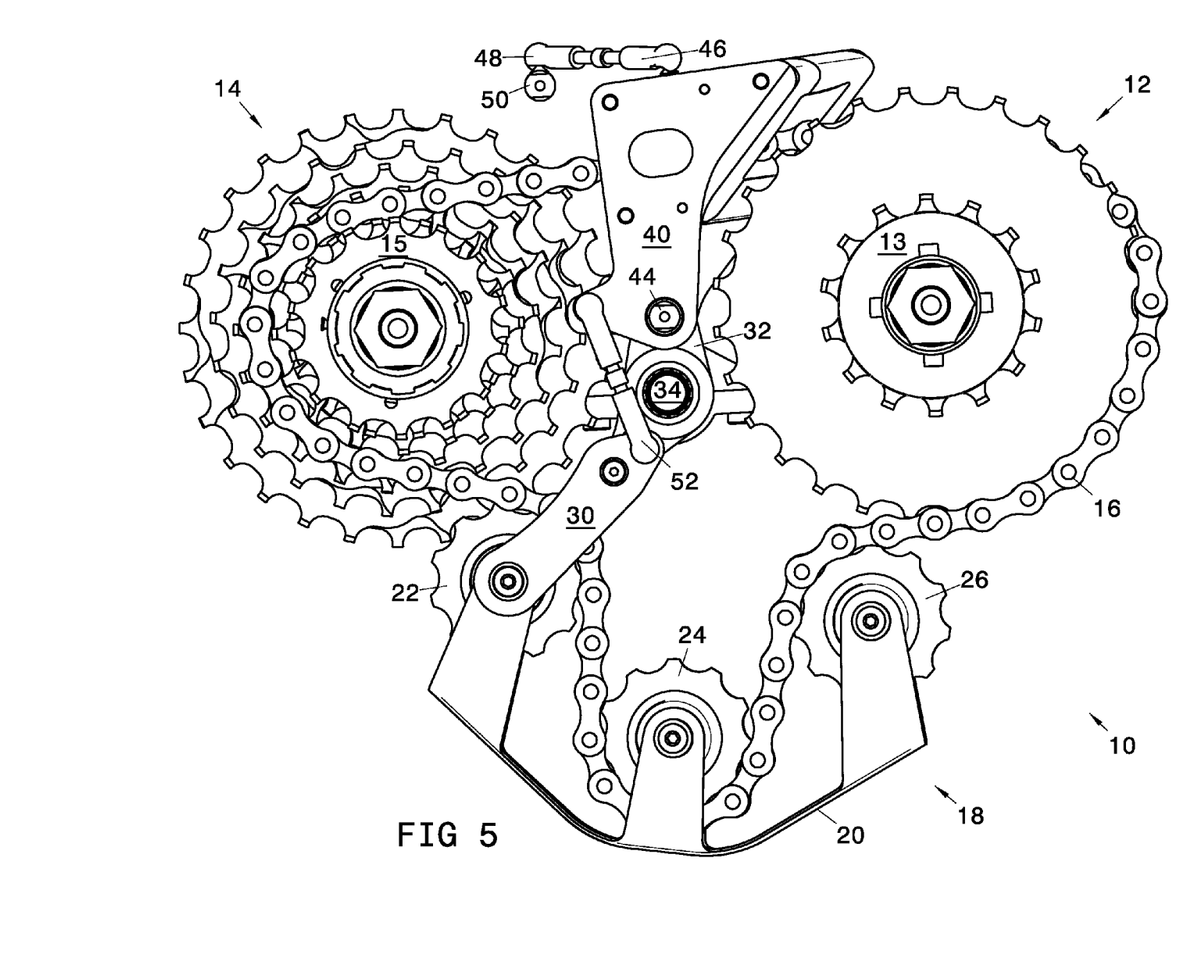
FIG. 5 is a side view of the gear set configuration of FIG. 4.
Figure 6:
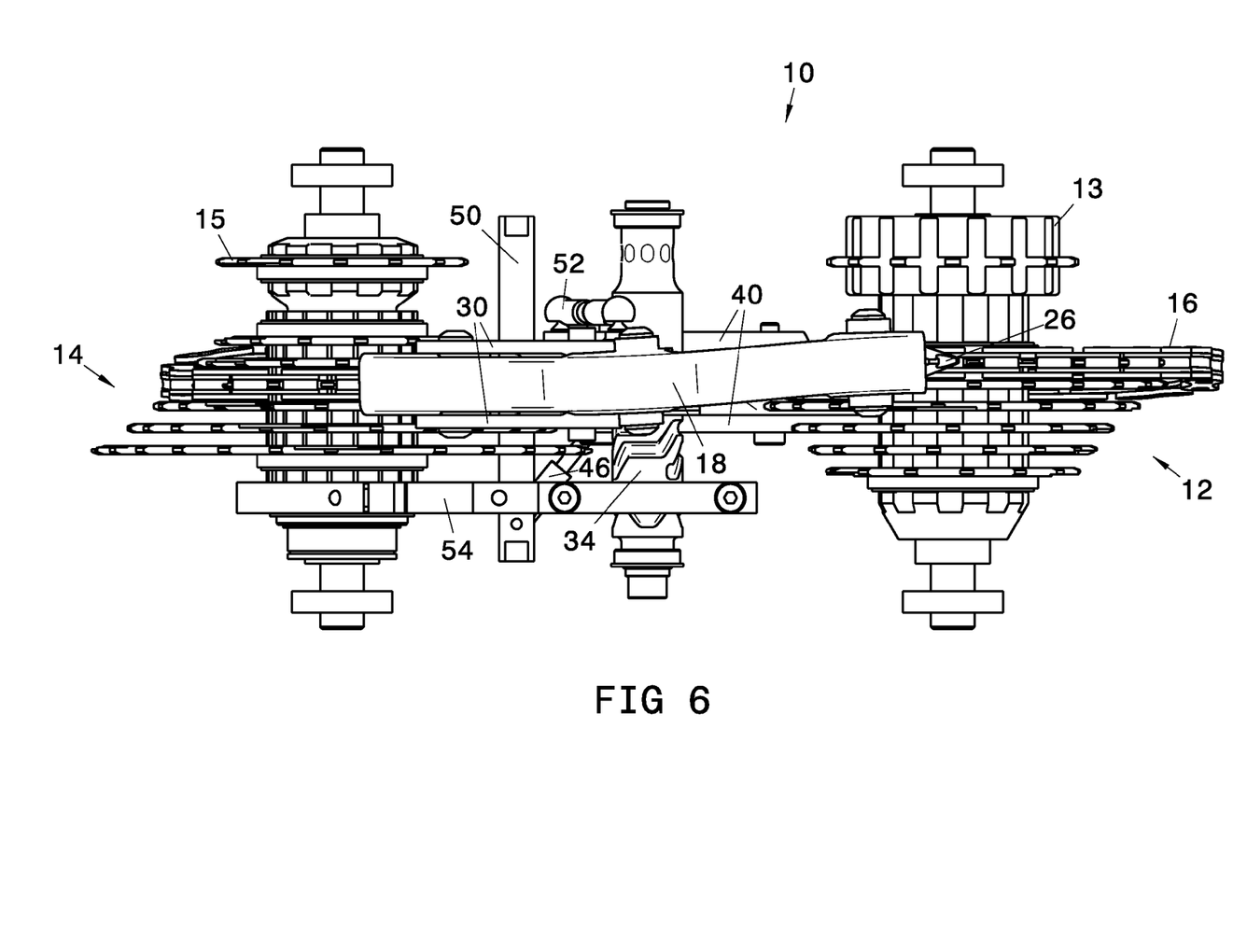
FIG. 6 is a bottom view of the gear set configuration of FIG. 4.
Figure 8:
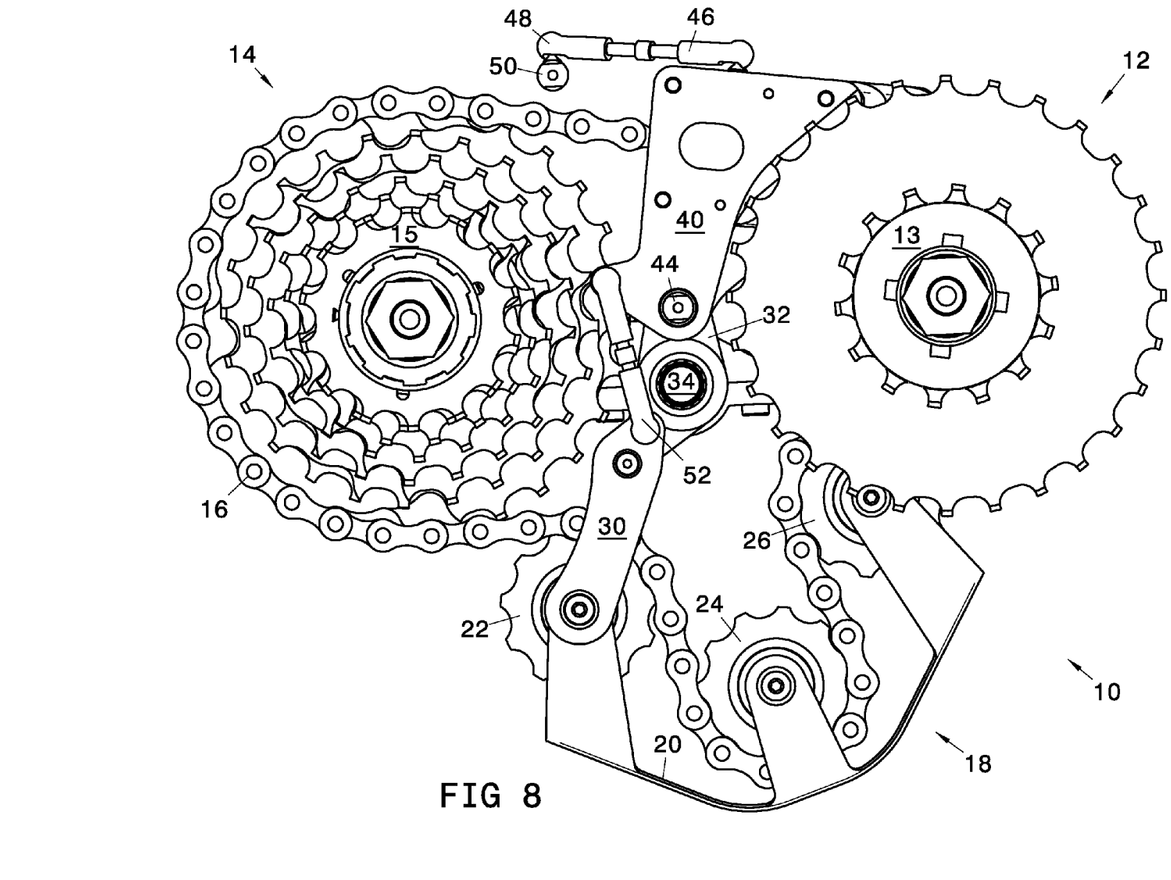
FIG. 8 is a side view of the gear set configuration of FIG. 7.
Figure 9:
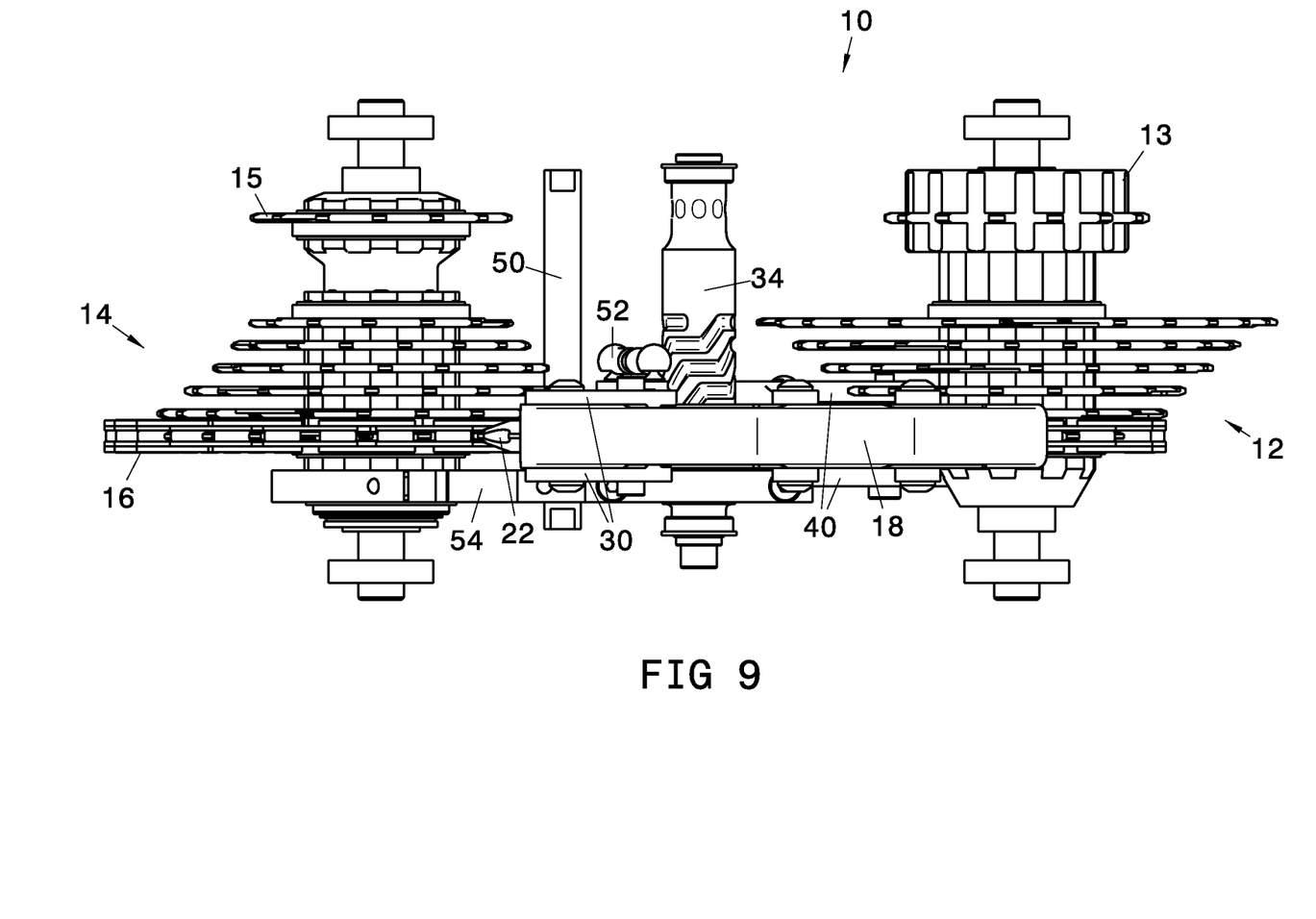
FIG. 9 is a bottom view of the gear set configuration of FIG. 7.

As the follower 32 is moved transversely, chain cage 40, which is hinged to follower 32, by transverse bar 44 positioned midway between sprocket sets 12, 14, is rotated about transverse bar 44 by way of the horizontal rotation of an upper tie rod 46, about its pivot point 48 on an upper transverse bar 50. As chain cage 40 rotates vertically, it causes link 30 to rotate by way of the action of a lower tie rod 52. Both chain cage 40 and link 30, and therefore tensioner 18 are rotated outwardly as they move transversely into the paper, to more closely approach the smaller sprockets on drive sprocket set 12 and accommodate the larger sprockets on driven sprocket set 14. This is illustrated in FIGS. 4, 5 and 6, which show gear set 10 completing a gear change onto the third smallest sprocket of driven set 14 and the second largest sprocket of driving set 12. Both chain tensioner 18 and chain cage 40 have been moved to the right, to more closely approach the slightly smaller sprocket of drive set 12. FIGS. 7, 8 and 9 show gear set 10 in its lowest gear, with chain 16 on largest sprocket of set 14. In this gear, tensioner 18 and chain cage 40 are spread apart by the maximum distance, to accommodate the largest sprocket of set 14 and to be brought closest to the smallest sprocket of drive set 12.

Figure 3:
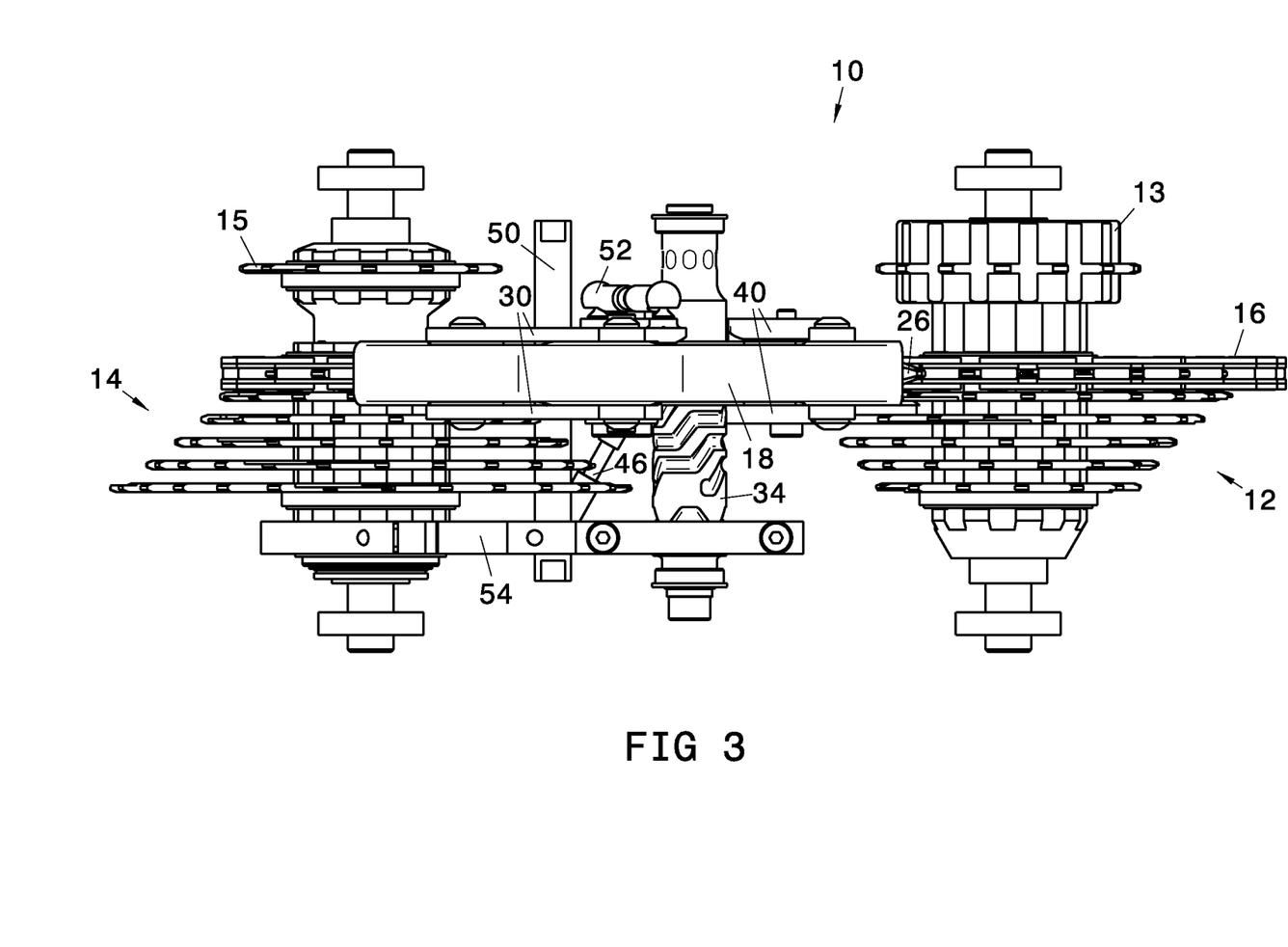
FIG. 3 is a bottom view of the gear set configuration of FIG. 1.

FIGS. 3, 6 and 9 show second guide bar follower 54, which moves driven sprocket set 14 transversely back and forth by a transverse sprocket spacing, every gear change. In second gear, for example, chain 16 is on the largest sprocket of the driving set 12 and second smallest sprocket of set 14. For these two sprockets to be in alignment, the driven set 14 must be moved over by one sprocket spacing relative to its position in first gear. During a gear change, however, as shown in FIG. 6, the chain-bearing sprocket of set 14 will be momentarily transversely displaced from alignment with the chain-bearing sprocket of set 12. Fortunately, the spring steel of which resilient bow 20 is formed, can bend sufficiently to accommodate this requirement.

Depending on the particular combination of sprockets from sets 12 and 14 more or less chain is needed to make the part of the circuit of chain 16 extending around both sprockets being used. If more is needed, then the chain tensioner 18 flattens, yielding chain slack under the greater chain tension and permitting more chain for the rest of the circuit. When less chain is needed, the chain tensioner 18 curves more tightly, taking up slack from the rest of the chain circuit. Also, when gears are being changed, more chain is needed, due to the transverse distance covered by the chain. As a result, the tensioner 18 flattens, as shown in FIG. 5.

Chain tensioner 18 also urges chain 16 to switch from one sprocket to another on driven sprocket set 14 by way of chain exit guide wheel 22, when driven sprocket set 14 is operatively moved by guide bar 34 while keeping chain tensioner 18 laterally stationary. Chain 16 is moved from sprocket to adjacent sprocket on drive sprocket set 12, by way of chain cage 40 being operatively moved by guide bar 34. Driven sprocket set 14 and chain tensioner 18 are now moved laterally in tandem by guide bar 34, aligning chain 16 with the new drive sprocket of drive sprocket set 12.

In an alternative preferred embodiment, sprocket sets do not move laterally relative to each other. Chain tensioner 18 urges chain 16 to move from sprocket to sprocket on driven sprocket set 14 by way of lateral movement, caused by rotation of guide bar 34. When the chain 16 is moved to a new driven sprocket, the driving action of the chain-driving sprocket set 12, naturally causes the chain to move to the drive sprocket of set 12 that is aligned to the new chain-driving sprocket of driven set 14.

In yet another preferred embodiment, drive sprocket set 12 consists of a single drive sprocket, which can be laterally aligned with each driven sprocket of driven sprocket set 14. Tensioner 18 moves the chain from a current chain-driven sprocket to a new chain-driven sprocket of driven sprocket set 14 by way of lateral movement caused by rotation of guide bar 34. The driving action of the chain 16 causes the single drive sprocket of drive sprocket set 12 to move laterally, aligning with the chain-driven sprocket of driven sprocket set 14. Tensioner 18 accommodates the momentary longitudinal misalignment between chain-driving and chain-driven sprockets present during gear changes, while chain cage 40 prevents chain 16 from dropping off the single drive sprocket of set 12.

Gear jumping, or shifting by more than one gear at a time, is possible with the embodiment shown, as chain 16 can be very quickly walked over several gears at a time.

Chain tensioner 18 is preferably made of 20 gauge spring steel, for example, cold rolled spheroidized annealed SAE/AISI 1050 spring steel, 0.040 in thick, formed, hardened and tempered, to have the transverse flexibility to accommodate misalignment between a driving sprocket of set 12 and a driven sprocket of set 14 during gear changes. The resilient bow 20 is shaped so that lateral misalignment is induced with minimal force. Preferably, a force of less that 5 Newtons will deviate the chain entry guide wheel 26 laterally by a centimeter, while restraining the chain exit guide wheel 22. A higher force is required to flatten the resilient bow 20. Preferably a force of more than 5 Newtons is needed to part the chain entry and chain exit guide wheels 22, 26 by a centimeter by flattening the resilient bow 20 longitudinally.

Referring to FIG. 10, in one preferred embodiment a gear set 10 is incorporated into the design of a bicycle 110. In an alternative preferred embodiment gear set 10 is enclosed, except for openings to permit chains to enter and exit. It is advantageous that chain 16 (FIG. 1) move quickly, to provide faster gear changes, to reduce torque loads on the sprockets of sets 12 and 14 (FIG. 1) and to reduce tension on chain 16. These lower torques and tensions permit smaller, lighter parts to be used, permitting a miniaturization of the gear set 10, which, in a preferred embodiment, uses a chain 16 with a ⅜ inch or ¼ inch pitch, meeting the requirements of ANSI B29.1 & ISO 606, as opposed to the traditional, heavier ½ inch pitch roller chain used in bicycles. The smaller chain pitch permits a smaller tooth pitch for sprockets of sets 12 and 14, permitting these sets to be smaller and lighter, important goals in bicycle design. In the preferred embodiment in which gear set 10 is enclosed, the housing used may be smaller and therefore lighter, due to the small size of gear set 10.

To achieve these goals, speed of rotation is stepped up from a set of pedals 112 to gear set 10 and then reduced from gear set 10 to the rear wheel 122. The mechanisms for doing this are first a 2.5:1 planetary gear set (not shown) within a pedal hub 114, driving a pedal-hub sprocket (not shown), and a 2:1 step up due to chain 116 operatively connecting the pedal-hub sprocket with the smaller input freewheel sprocket 13 (FIG. 1), for a 5:1 step up from pedals 112 to drive sprocket set 12. There is then a step down from output sprocket 15 (FIG. 1) to rear wheel 122, by way of chain 118 and a larger rear wheel sprocket 120.

Sprocket 120 is mounted on rear wheel 122 in such a manner that it will slip relative to wheel 122 in a single direction of rotation, but only when there is considerable tension between the two. Consequently, when a rider on bicycle 110 is coasting, chain 118 and therefore chain 16 will be in motion, permitting a gear change. Input freewheel sprocket 13 allows sprocket set 12 to rotate, while chain 116 remains stationary. But if gear set 10 jams (a very unlikely occurrence) then rear wheel 122 will rotate free of sprocket 120, which will be restrained by chain 118.

While a number of exemplary aspects and embodiments have been discussed above, those possessed of skill in the art will recognize certain modifications, permutations, additions and sub-combinations thereof. It is therefore intended that the following appended claims and claims hereafter introduced are interpreted to include all such modifications, permutations, additions and sub-combinations as are within their true spirit and scope.

The invention claimed is:

1. A gear set, comprising:
   (a) two sprocket sets, defining a longitudinal dimension along which said sprocket sets are aligned and a transverse dimension, along which sprockets of each set are spaced;
   (b) a roller-chain tensioner, comprising a resilient bow, a chain-entrance guide wheel, rotatably supported by said resilient bow and a chain-exit guide wheel, rotatably supported by said resilient bow;
   (c) a roller-chain, arranged in a loop, and adapted to move, about a sprocket of each of said sprocket sets and said roller-chain tensioner guide wheels; and
   (d) wherein said resilient bow is bendable in said transverse dimension, to permit said chain-exit guide wheel to be displaced from said chain-entrance guide wheel in said transverse dimension.

2. The gear set of claim 1, wherein said resilient bow is bendable in said longitudinal dimension.

3. The gear set of claim 1, wherein said roller-chain tensioner includes a third guide wheel, positioned between said chain-entrance guide wheel and said chain-exit guide wheel.

4. The gear set of claim 3, wherein said roller-chain is threaded about an opposite facing side of said third guide wheel, relative to its position on said chain-entrance guide wheel and said chain-exit guide wheel.

5. The gear set of claim 1, wherein said two sprocket sets include a driving sprocket set and a driven sprocket set, and wherein said chain-exit guide wheel is positioned adjacent to a sprocket of said driven sprocket set.

6. The gear set of claim 1, wherein said resilient bow flattens out in said longitudinal dimension, so as to part said chain guide wheels.

7. The gear set of claim 1, wherein bending of said resilient bow helps effect a gear change.

8. The gear set of claim 7, wherein said roller-chain tensioner is moved transversely during a gear change.

9. A gear set, comprising:
   (a) two sprocket sets, defining a longitudinal dimension along which said sprocket sets are aligned, and a transverse dimension, along which additional sprockets of at least one of said sets are spaced;
   (b) a roller-chain tensioner, including a resilient bow-shaped bendable structure rotatably supporting a chain-entrance guide wheel and a chain-exit guide wheel;
   (c) a roller-chain, arranged in a loop about a sprocket from each said sprocket set and said roller-chain tensioner guide wheels; and
   (d) wherein said roller-chain tensioner is moved transversely during a change of gears.

10. The assembly of claim 9, wherein said structure defines a first end and a second end and a primary plane that bisects said structure along its length when said structure is not being stressed and wherein said structure is bendable transverse to its primary plane so that said first end may be moved out of alignment to said second end by a centimeter, by applying force to said first end.

11. The assembly of claim 9, wherein said resilient bow shaped bendable structure is made of spring steel.

12. The gear set of claim 9, wherein said roller-chain tensioner includes a third guide wheel, positioned between said chain-entrance guide wheel and said chain-exit guide wheel.

13. The gear set of claim 12, wherein said roller-chain is threaded about an opposite facing side of said third guide wheel, relative to its position on said chain-entrance guide wheel and said chain-exit guide wheel.

14. The gear set of claim 9, wherein said two sprocket sets include a driving sprocket set and a driven sprocket set, and wherein said chain-exit guide wheel is positioned adjacent to a sprocket of said driven sprocket set.

15. The gear set of claim 14, wherein said chain tensioner is moved inwardly toward said driven sprocket set during a gear change to a higher gear, so as to keep said chain-exit guide wheel close to said driven sprocket.

16. The gear set of claim 14, wherein said chain includes a driving portion that is tensioned by a sprocket of said driving sprocket set and pulls said driven sprocket set, and wherein a chain cage is position about said driving portion and is moved transversely to help effect a gear change and wherein said chain cage is moved inwardly toward said driving sprocket set during a gear change to a lower gear, so that said chain cage can be positioned close to said driving sprocket.

17. The gear set of claim 9 wherein one of said two sprockets sets includes a single sprocket only.

18. A gear set, comprising:
   (a) a driving sprocket set and a driven sprocket set, defining a longitudinal dimension along which said sprocket sets are aligned, and a transverse dimension, along which sprockets of each set are spaced;
   (b) a roller-chain, arranged in a loop about a sprocket from each said sprocket set;
   (c) a bendable roller-chain shifting structure comprising a resilient bow, a plurality of chain-guide wheels mounted on said resilient bow, said bendable roller-chain shifting structure bendable in said transverse dimension,
   (d) wherein said roller chain is shifted among said sprockets through bending of said roller chain shifting structure.

* * * * *

UNITED STATES PATENT AND TRADEMARK OFFICE
CERTIFICATE OF CORRECTION

PATENT NO. : 8,944,945 B2  
APPLICATION NO. : 12/759936  
DATED : February 3, 2015  
INVENTOR(S) : Richard J. Kilshaw Page 1 of 1

It is certified that error appears in the above-identified patent and that said Letters Patent is hereby corrected as shown below:

In the Claims

Column 7, Line 6, in Claim #16, the word "position" should be the word "positioned" and;

Column 7, Lines 11-12, in Claim #17, the word "sprockets" should be the singular version "sprocket".

Signed and Sealed this
Fifth Day of April, 2016

Michelle K. Lee
*Director of the United States Patent and Trademark Office*